US010280244B2

(12) United States Patent
Inoue et al.

(10) Patent No.: US 10,280,244 B2
(45) Date of Patent: May 7, 2019

(54) NITRILE GROUP-CONTAINING COPOLYMER RUBBER, CROSS-LINKABLE RUBBER COMPOSITION, AND CROSS-LINKED RUBBER

(71) Applicant: ZEON CORPORATION, Tokyo (JP)

(72) Inventors: Sayaka Inoue, Tokyo (JP); Chikara Katano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 15/124,056

(22) PCT Filed: Mar. 25, 2015

(86) PCT No.: PCT/JP2015/059115
§ 371 (c)(1),
(2) Date: Sep. 7, 2016

(87) PCT Pub. No.: WO2015/147052
PCT Pub. Date: Oct. 1, 2015

(65) Prior Publication Data
US 2017/0015773 A1 Jan. 19, 2017

(30) Foreign Application Priority Data
Mar. 27, 2014 (JP) ................. 2014-064992

(51) Int. Cl.
C08F 236/12 (2006.01)
C08C 19/02 (2006.01)
C08L 9/02 (2006.01)
C08F 220/44 (2006.01)
C08F 2/38 (2006.01)

(52) U.S. Cl.
CPC ............ C08F 236/12 (2013.01); C08C 19/02 (2013.01); C08F 220/44 (2013.01); C08L 9/02 (2013.01); C08F 2/38 (2013.01); C08F 2810/20 (2013.01)

(58) Field of Classification Search
CPC ........ C08F 236/12; C08F 220/44; C08F 2/38; C08L 9/02; C08C 19/02; C08J 3/24
See application file for complete search history.

(56) References Cited

U.S. PATENT DOCUMENTS

| 5,651,995 | A | * | 7/1997 | Oyama | C08C 19/02 524/565 |
| 5,654,364 | A | * | 8/1997 | Bates | C08C 19/02 525/98 |
| 5,703,189 | A | | 12/1997 | Tsuji et al. | |
| 5,807,941 | A | | 9/1998 | Tsuji et al. | |
| 2003/0088035 | A1 | | 5/2003 | Guerin et al. | |
| 2003/0096913 | A1 | | 5/2003 | Guerin | |
| 2004/0236029 | A1 | | 11/2004 | Guerin et al. | |
| 2008/0090970 | A1 | | 4/2008 | Guerin et al. | |
| 2010/0240838 | A1 | | 9/2010 | Guerin et al. | |
| 2010/0240848 | A1 | | 9/2010 | Guerin et al. | |
| 2010/0305278 | A1 | | 12/2010 | Hosotani et al. | |
| 2013/0005916 | A1 | * | 1/2013 | Ong | B01J 31/2278 525/338 |

FOREIGN PATENT DOCUMENTS

| EP | 0779300 A1 | 6/1997 |
| JP | S53-109591 A | 9/1978 |
| JP | H08-100025 A | 4/1996 |
| JP | 2005-187544 A | 7/2005 |
| JP | 2009-286926 A | 12/2009 |
| WO | 02/100941 A1 | 12/2002 |
| WO | 2009/082004 A1 | 7/2009 |

OTHER PUBLICATIONS

Jun. 9, 2015 International Search Report issued in International Patent Application No. PCT/JP2015/059115.
Sep. 27, 2016 International Preliminary Report on Patetability issued in International Patent Application No PCT/JP2015/059115.
Apr. 23, 2018 Office Action issued in Russian Application No. 2016136209/04(056864).
Oct. 17, 2017 extended European Search Report issued in European Application No. 15768035.6.
Christoph J. Durr et al., "Determining the Mark-Houwink parameters of nitrile rubber: a chromatographic investigation of the NBR microstructure," Polym. Chem., 2013, 4, 4755-4767.

* cited by examiner

Primary Examiner — Roberto Rabago
(74) Attorney, Agent, or Firm — Oliff PLC

(57) ABSTRACT

A nitrile group-containing copolymer rubber containing α,β-ethylenically unsaturated nitrile monomer units in 10 to 60 wt % and having a weight average radius of gyration of 10 to 100 nm in range is provided. According to the present invention, a nitrile group-containing copolymer rubber excellent in processability and able to give cross-linked rubber excellent in normal physical properties can be provided.

8 Claims, No Drawings

NITRILE GROUP-CONTAINING COPOLYMER RUBBER, CROSS-LINKABLE RUBBER COMPOSITION, AND CROSS-LINKED RUBBER

TECHNICAL FIELD

The present invention relates to a nitrile group-containing copolymer rubber excellent in processability and able to give cross-linked rubber excellent in normal physical properties and to a cross-linkable rubber composition and cross-linked rubber obtained using this nitrile group-containing copolymer rubber.

BACKGROUND ART

In the past, nitrile rubber (acrylonitrile-butadiene copolymer rubber) has been used as a material for rubber parts for automobile such as hoses, belts, and tubes by making use of its oil resistance, mechanical properties, chemical resistance, etc. Further, highly saturated nitrile rubber obtained by saturation of carbon-carbon double bonds in the polymer main chain of nitrile rubber by hydrogenation etc. is further excellent in heat resistance and is being used for rubber parts such as seals, belts, hoses, and diaphragms.

In view of such a situation, Patent Document 1 discloses a method of improving the processability such as fluidity by causing a metathesis reaction of a nitrile group-containing copolymer rubber in the presence of a metathesis catalyst to thereby obtain a nitrile group-containing copolymer rubber lowered in molecular weight.

However, in the art of the above Patent Document 1, due to the reduction of the molecular weight, the obtained nitrile group-containing copolymer rubber is improved in fluidity, but when made into cross-linked rubber, the mechanical properties such as the normal physical properties are not sufficient. For this reason, not only excellent processability (fluidity), but also improvement of the mechanical properties of the obtained cross-linked rubber has been sought.

RELATED ART

Patent Documents

Patent Document 1: International Publication No. WO02/100941A

SUMMARY OF THE INVENTION

Problem to be Solved by the Invention

The present invention has as its object the provision of nitrile group-containing copolymer rubber excellent in processability and able to give cross-linked rubber excellent in normal physical properties (mechanical properties) and a cross-linkable rubber composition and cross-linked rubber obtained using this nitrile group-containing copolymer rubber.

Means for Solving the Problem

The inventors engaged in intensive research for achieving the above object and as a result discovered that in nitrile group-containing copolymer rubber containing $\alpha,\beta$-ethylenically unsaturated nitrile monomer units in a ratio of 10 to 60 wt %, by controlling the weight average radius of gyration to 10 to 100 nm in range, the fluidity is high and thereby the processability is excellent and, further, when made into cross-linked rubber, the normal physical properties are also excellent, and thereby completed the present invention.

That is, according to the present invention, there is provided a nitrile group-containing copolymer rubber containing $\alpha,\beta$-ethylenically unsaturated nitrile monomer units in 10 to 60 wt % and having a weight average radius of gyration of 10 to 100 nm in range.

In the nitrile group-containing copolymer rubber of the present invention, preferably the weight average molecular weight is 10,000 to 5,000,000.

Note that, preferably the nitrile group-containing copolymer rubber of the present invention has an iodine value of 120 or less.

Further, according to the present invention, there are provided a cross-linkable rubber composition containing the above nitrile group-containing copolymer rubber and cross-linking agent, and a cross-linked rubber obtained by cross-linking this cross-linkable rubber composition.

Furthermore, according to the present invention, there is provided a method of production of the above nitrile group-containing copolymer rubber comprising a step of polymerizing a monomer containing an $\alpha,\beta$-ethylenically unsaturated nitrile monomer in the presence of a molecular weight adjuster and a step of additionally adding the molecular weight adjuster at a stage when a polymerization conversion rate becomes 10 to 80% in the step of polymerizing.

In the method of production of the present invention, preferably a ratio of an amount of addition of the molecular weight adjuster at a time of start of polymerization and an amount of addition of the molecular weight adjuster in the additionally adding is a weight ratio of an "amount of addition of molecular weight adjuster at a time of start of polymerization:amount of addition of molecular weight adjuster in the additionally adding" of 0.5:1 to 1:0.1.

Effects of the Invention

According to the present invention, it is possible to provide nitrile group-containing copolymer rubber excellent in processability and able to give cross-linked rubber excellent in normal physical properties (mechanical properties) and a cross-linkable rubber composition and cross-linked rubber obtained using this nitrile group-containing copolymer rubber.

DESCRIPTION OF EMBODIMENTS

Nitrile Group-Containing Copolymer Rubber

The nitrile group-containing copolymer rubber of the present invention is a rubber containing $\alpha,\beta$-ethylenically unsaturated nitrile monomer units in a ratio of 10 to 60 wt % and having a weight average radius of gyration of 10 to 100 nm in range.

The $\alpha,\beta$-ethylenically unsaturated nitrile monomer forming the $\alpha,\beta$-ethylenically unsaturated nitrile monomer units contained in the nitrile group-containing copolymer rubber of the present invention is not particularly limited, but one having 3 to 18 carbon atoms is preferable, while one having 3 to 9 carbon atoms is particularly preferable. As specific examples of these, acrylonitrile, methacrylonitrile, $\alpha$-chloroacrylonitrile, etc. may be mentioned. Among these as well, acrylonitrile is preferable. These $\alpha,\beta$-ethylenically unsaturated nitrile monomers may be used as single types alone or two types or more may be jointly used.

In the nitrile group-containing copolymer rubber of the present invention, the content of the α,β-ethylenically unsaturated nitrile monomer units is 10 to 60 wt %, preferably 20 to 50 wt %, more preferably 25 to 45 wt %. If the content of the α,β-ethylenically unsaturated nitrile monomer units is too small, the obtained cross-linked product is liable to be inferior in oil resistance, while conversely if too great, the cold resistance may fall.

Also, the nitrile group-containing copolymer rubber of the present invention preferably further contains diene monomer units and/or α-olefin monomer units from the viewpoint of improvement of the mechanical properties by rubbery elasticity.

As the diene monomer forming the diene monomer units, a conjugated diene having 4 or more carbon atoms such as 1,3-butadiene, isoprene, 2,3-dimethyl-1,3-butadiene, and 1,3-pentadiene; and a nonconjugated diene having 5 to 12 carbon atoms such as 1,4-pentadiene and 1,4-hexadiene may be mentioned. Among these, a conjugated diene is preferable, while 1,3-butadiene is more preferable. As the α-olefin monomer forming the α-olefin monomer units, one having 2 to 12 carbon atoms is preferable. Ethylene, propylene, 1-butene, 4-methyl-1-pentene, 1-hexene, 1-octene, etc. may be mentioned.

In the nitrile group-containing copolymer rubber of the present invention, the content of the diene monomer units and/or α-olefin monomer units is preferably 40 to 90 wt %, more preferably 50 to 80 wt %, still more preferably 55 to 75 wt %. If the content of the diene monomer units and/or α-olefin monomer units is too small, the obtained cross-linked rubber is liable to become insufficient in rubbery elasticity. On the other hand, if too great, the heat aging resistance or chemical resistance stability may become impaired.

Further, the nitrile group-containing copolymer rubber of the present invention may further contain, in addition to the α,β-ethylenically unsaturated nitrile monomer units and diene monomer units and/or α-olefin monomer units, units of another monomer copolymerizable with these monomers. As this other monomer, a nonconjugated diene monomer, aromatic vinyl monomer, α,β-ethylenically unsaturated monocarboxylic acid and its ester, α,β-ethylenically unsaturated polyvalent carboxylic acid and its monoester, a polyvalent ester and anhydride, cross-linkable monomer, copolymerizable antiaging agent, etc. may be mentioned.

As the nonconjugated diene monomer, one having 5 to 12 carbon atoms is preferable. For example, 1,4-pentadiene, 1,4-hexadiene, vinylnorbornene, dicyclopentadiene, etc. may be mentioned.

As the aromatic vinyl monomer, for example, styrene, α-methylstyrene, vinylpyridine, etc. may be mentioned.

As the α,β-ethylenically unsaturated monocarboxylic acid, for example, acrylic acid, methacrylic acid, crotonic acid, cinnamic acid, etc. are preferably mentioned.

As the α,β-ethylenically unsaturated monocarboxylic acid ester, for example, ethyl (meth)acrylate (meaning ethyl acrylate and ethyl methacrylate, same below), butyl (meth) acrylate, 2-ethylhexyl (meth)acrylate, 2-methoxyethyl (meth)acrylate, etc. may be mentioned.

As the α,β-ethylenically unsaturated polyvalent carboxylic acid, for example, maleic acid, fumaric acid, itaconic acid, etc. may be mentioned.

As the α,β-ethylenically unsaturated polyvalent carboxylic acid monoester, for example, a maleic acid monoalkyl ester such as monomethyl maleate, monoethyl maleate, monopropyl maleate, and mono n-butyl maleate; a fumaric acid monoalkyl ester such as monomethyl fumarate, monoethyl fumarate, monopropyl fumarate, and mono n-butyl fumarate; a citraconic acid monoalkyl ester such as monomethyl citraconate, monoethyl citraconate, monopropyl citraconate, and mono n-butyl citraconate; an itaconic acid monoalkyl ester such as monomethyl itaconate, monoethyl itaconate, monopropyl itaconate, and mono n-butyl itaconate; etc. may be mentioned.

As the α,β-ethylenically unsaturated polyvalent carboxylic acid polyvalent ester, for example, dimethyl maleate, di-n-butyl maleate, dimethyl fumarate, di-n-butyl fumarate, dimethyl itaconate, di-n-butyl itaconate, etc. may be mentioned.

As the α,β-ethylenically unsaturated polyvalent carboxylic acid anhydride, for example, maleic anhydride, itaconic anhydride, etc. may be mentioned.

As the cross-linkable monomer, for example, a polyfunctional ethylenically unsaturated monomer such as a divinyl compound such as divinylbenzene; a di(meth)acrylic acid ester such as ethylene di(meth)acrylate, diethyleneglycol di(meth)acrylate, and ethyleneglycol di(meth)acrylate; a trimethacrylic acid ester such as trimethylolpropane tri (meth)acrylate; etc. and also a self cross-linkable monomer such as N-methylol(meth)acrylamide and N,N'-dimethylol (meth)acrylamide etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, N-phenyl-4-(4-vinyl benzyloxy)aniline, etc. may be mentioned.

These copolymerizable other monomers may be used as a plurality of types together. In the nitrile group-containing copolymer rubber of the present invention, the content of the units of the other monomer is preferably 50 wt % or less, more preferably 30 wt % or less, still more preferably 10 wt % or less.

Further, the nitrile group-containing copolymer rubber of the present invention has a weight average radius of gyration controlled to 10 to 100 nm in range, preferably controlled to 20 to 90 nm in range, more preferably 30 to 80 nm in range. In the present invention, by controlling the weight average radius of gyration to the above range, the nitrile group-containing copolymer rubber can be made one high in fluidity and excellent in processability and further can be made one excellent in normal physical properties when made into the cross-linked rubber by cross-linking the rubber. If the weight average radius of gyration is too small or is too large, the fluidity falls, the processability becomes inferior, and the normal physical properties when made into cross-linked rubber also end up becoming inferior.

Note that, the "weight average radius of gyration" is an indicator showing the spread of the molecular chains from the center of gravity. For example, a solution of a nitrile group-containing copolymer rubber prepared by dissolving the nitrile group-containing copolymer rubber of the present invention in a solvent which can dissolve it (for example, chloroform or tetrahydrofuran) can be measured using the GPC multi-angle light scattering method. Specifically, the nitrile group-containing copolymer rubber is dissolved in a solvent, then the obtained solution of the nitrile group-containing copolymer rubber is measured for weight average absolute molecular weight and weight average radius of gyration using a gel permeation chromatography (GPC) system provided with a multi-angle light scattering (MALS) detector and differential refractometer. In this case, the Zimm formula may be used and a Debye plot drawn from the measurement value obtained from the multi-angle light scattering detector and the value of the concentration measured by the differential refractometer.

Note that, the dn/dc value (value showing by what extent refractive index of polymer solution has changed with respect to an increase in concentration of solute: increase in concentration of refractive index) is required when finding the weight average absolute molecular weight and weight average radius of gyration, but, separate from the above measurement by GPC, it is also possible to prepare a plurality of solutions of nitrile group-containing copolymer rubber of different rubber concentrations (for example, solutions of four types of concentration) and measure these solutions for dn/dc value using a refractive index measuring device.

Note that, in the present invention, the method of making the weight average radius of gyration within the above range is not particularly limited, but the method of adjusting the timing of addition and amount of addition of the molecular weight adjuster at the time of polymerization of the monomer forming the nitrile group-containing copolymer rubber by the emulsion polymerization method etc. may be mentioned. Further, the method of adjusting the composition of the copolymer of the nitrile group-containing copolymer rubber, the method of controlling the polymerization conversion rate at the time of stopping the polymerization reaction, the method of changing the type of the molecular weight adjuster, the method of control by a double decomposition reaction, the method of selecting the type of the chain transfer agent by RAFT polymerization, and the method of applying a high shear force to the nitrile group-containing copolymer rubber obtained by polymerization in the presence of an antiaging agent to adjust it (adjustment by type or amount of antiaging agent, shear conditions, etc.) etc. may be mentioned. In particular, when polymerizing the monomer forming the nitrile group-containing copolymer rubber by the emulsion polymerization method etc., the method of adjusting the timing of addition and the amount of addition of the molecular weight adjuster is preferable. Specifically, the method of adding the molecular weight adjuster at the time of start of emulsion polymerization, adding it even in the mid-course of emulsion polymerization, and making the amount of addition a predetermined range is preferable.

Further, the nitrile group-containing copolymer rubber of the present invention preferably has a weight average absolute molecular weight (Mw) of 10,000 to 5,000,000, more preferably 50,000 to 3,000,000, still more preferably 100,000 to 1,500,000. By making the weight average absolute molecular weight (Mw) within the above range, the nitrile group-containing copolymer rubber of the present invention can be made higher in fluidity and the processability can be improved more. Furthermore, it is possible to further enhance the normal physical properties when made into cross-linked rubber. Note that, the weight average absolute molecular weight (Mw) can be measured using the above-mentioned GPC multi-angle light scattering method.

Note that, the Mooney viscosity ($ML_{1+4}$, 100° C.) of the nitrile group-containing copolymer rubber of the present invention is preferably 10 to 150, more preferably 30 to 110, particularly preferably 40 to 80. By making the Mooney viscosity within the above range, it is possible to make the action and effect of the present invention much more remarkable.

Further, the iodine value of the nitrile group-containing copolymer rubber of the present invention is not particularly limited, but from the point of further enhancing the heat aging resistance or ozone resistance, it is preferably 120 or less, more preferably 80 or less, still more preferably 60 or less, particularly preferably 30 or less.

The method of production of the nitrile group-containing copolymer rubber of the present invention is not particularly limited, but the rubber is obtained by copolymerizing the above-mentioned monomers and, as required, hydrogenating the carbon-carbon double bonds in the obtained copolymer. The polymerization method is not particularly limited. A known emulsion polymerization method or solution polymerization method may be used, but from the viewpoint of industrial productivity, the emulsion polymerization method is preferable. At the time of emulsion polymerization, usually used polymerization auxiliary materials such as an emulsifier, polymerization initiator, and molecular weight adjuster can be used.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkylbenzene sulfonate such as sodium dodecylbenzene sulfonate, a higher alcohol sulfuric acid ester salt, and an alkyl sulfosuccinate; a copolymerizable emulsifier such as a sulfo ester of an $\alpha,\beta$-unsaturated carboxylic acid, a sulfate ester of an $\alpha,\beta$-unsaturated carboxylic acid, and a sulfoalkylaryl ether; etc. may be mentioned. The amount of use of the emulsifier is preferably 0.1 to 10 parts by weight with respect to 100 parts by weight of the monomers used for polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium perphosphate, and hydrogen perchlorate; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclohexane carbonitrile, and methyl azobisisobutyrate; etc. may be mentioned. These polymerization initiators can be used alone or as two or more types combined. As the polymerization initiator, an inorganic or organic peroxide is preferable. When using a polymerization initiator comprised of a peroxide, a reducing agent such as sodium bisulfite and ferrous sulfate may be combined with for use as a redox-type polymerization initiator. The amount of use of the polymerization initiator is preferably 0.01 to 2 parts by weight with respect to 100 parts by weight of the monomers used for polymerization.

The molecular weight adjuster is not particularly limited, but a mercaptan such as t-dodecyl mercaptan, n-dodecyl mercaptan, and octyl mercaptan; a halogenated hydrocarbon such as carbon tetrachloride, methylene chloride, and methylene bromide; an $\alpha$-methylstyrene dimer; a sulfur-containing compound such as tetraethylthiuram disulfide, dipentamethylenethiuram disulfide, and diisopropylxantogen disulfide etc. may be mentioned. These can be used alone or as two or more types combined. Among these as well, a mercaptan is preferable, while t-dodecyl mercaptan is more preferable.

Note that, when producing the nitrile group-containing copolymer rubber of the present invention, the monomer used for the polymerization and the polymerization auxiliary materials which are normally used such as the above-mentioned emulsifier, polymerization initiator, and molecular weight adjuster are usually mixed into the polymerization system at the time of the start of polymerization so as to cause the polymerization, but among the polymerization auxiliary materials, the molecular weight adjuster is preferably added in the following manner. That is, preferably, in the molecular weight adjuster used for the polymerization, part is added to the polymerization system at the time of start of polymerization to start the emulsion polymerization, then the remainder is added at the stage of a predetermined polymerization conversion rate.

That is, for example, when making the nitrile group-containing copolymer rubber of the present invention one containing α,β-ethylenically unsaturated nitrile monomer units and diene monomer units and/or α-olefin monomer units, the emulsion polymerization of the monomer mixture containing the α,β-ethylenically unsaturated nitrile monomer and diene monomer and/or α-olefin monomer is started where part of the molecular weight adjuster used for the polymerization is added to the polymerization system at the time of start of polymerization, then the remainder of the molecular weight adjuster used for the polymerization is added to the polymerization system so as to continue the emulsion polymerization when a polymerization conversion rate is reached at a later explained predetermined polymerization conversion.

As the timing for mid-course addition of the molecular weight adjuster, the stage after the start of emulsion polymerization when the polymerization conversion rate becomes 10 to 80% is preferable, while the stage when it becomes 20 to 65% is more preferable. Note that, the method of addition at the stage of adding the molecular weight adjuster in the mid-course is not particularly limited, but the method of adding the molecular weight adjuster added in the mid-course in one batch may be used or the method of adding it divided into a plurality of batches may be used.

For the amount of addition of the molecular weight adjuster, the amount of addition at the time of start of polymeration is preferably 0.01 to 2 parts by weight with respect to 100 parts by weight of the monomer used for the polymerization, more preferably 0.05 to 1 part by weight, still more preferably 0.1 to 1 part by weight, while the amount of addition by the mid-course addition is preferably 0.01 to 1 part by weight with respect to 100 parts by weight of the monomer used for the polymerization, more preferably 0.05 to 1 part by weight, still more preferably 0.05 to 0.5 part by weight. In this way, when producing the nitrile group-containing copolymer rubber of the present invention, by adjusting the timing of the mid-course addition of the molecular weight adjuster, the amount of addition at the time of start of polymerization, and the amount of addition by mid-course addition, it is possible to control the radius of gyration at the weight average absolute molecular weight.

Further, when producing the nitrile group-containing copolymer rubber of the present invention, as explained above, when adding the molecular weight adjuster in the mid-course, it may be added in the mid-course with at least part of the monomer used for polymerization. That is, it is possible to charge part of the total monomer used for the polymerization at the time of start of polymerization and add the remainder in the mid-course together with the molecular weight adjuster. In this case, the ratio of the monomer added in the mid-course may be suitably determined in accordance with the amount etc. of the molecular weight adjuster added in the mid-course, but is preferably 1 to 20 wt % with respect to the total monomer used for the polymerization, more preferably 5 to 15 wt %. Further, when using a plurality of types of monomers as the monomer used for the polymerization, it is possible to add parts of all types of the plurality of types of monomers in the mid-course or add parts for some of the types of all of the types in the mid-course.

Note that, when producing the nitrile group-containing copolymer rubber of the present invention, the ratio of the amount of addition of the molecular weight adjuster at the time of start of polymerization and the amount of addition by mid-course addition is preferably a weight ratio of the "amount of addition at start of polymerization: amount of addition by mid-course addition" of 0.5:1 to 1:0.1, more preferably 1:1 to 1:0.1, particularly preferably 1:0.7 to 1:0.1. Further, the total amount of the molecular weight adjuster used for the polymerization (that is, the total of the amount of addition at the time of start of polymerization and the amount of addition by mid-course addition) is preferably 0.02 to 3 parts by weight with respect to 100 parts by weight of the monomer, more preferably 0.1 to 2 parts by weight, still more preferably 0.15 to 1.5 parts by weight.

For the medium of the emulsion polymerization, usually water is used. The amount of water is preferably 80 to 500 parts by weight with respect to 100 parts by weight of the monomer used for the polymerization, more preferably 80 to 300 parts by weight.

At the time of emulsion polymerization, further, in accordance with need, a polymerization secondary material such as a stabilizer, dispersant, pH adjuster, deoxidant, and particle size adjuster can be used. In the case of using these, the types and amounts of use are not particularly limited.

Further, for the obtained copolymer, in accordance with need, the copolymer can be hydrogenated (hydrogenation reaction). In this case, the hydrogenation method is not particularly limited. A known method can be employed.

Note that, the temperature of the emulsion polymerization is preferably 0 to 70° C., more preferably 0 to 30° C.

Cross-Linkable Rubber Composition

The cross-linkable rubber composition of the present invention is a composition of a nitrile group-containing copolymer rubber comprised of the above-mentioned nitrile group-containing copolymer rubber to which a cross-linking agent has been added. The cross-linking agent is not particularly limited. A sulfur-based cross-linking agent and an organic peroxide-based cross-linking agent may be mentioned, but when the nitrile group-containing copolymer rubber has monomer units having a carboxyl group, a polyamine cross-linking agent can also be used.

As the sulfur-based cross-linking agent, sulfurs such as powdered sulfur, flower of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, and high molecular weight polysulfide; sulfur donor compounds such as tetramethylthiuram disulfide, selenium dimethyldithiocarbarnate, and 2-(4'-morpholinodithio)benzothiazole; etc. may be mentioned. These may be used as single types alone or as a plurality of types together.

As the organic peroxide cross-linking agent, dicumyl peroxide, cumen hydroperoxide, t-butylcumyl peroxide, p-menthane hydroperoxide, di-t-butylcumyl peroxide, 1,3-bis (t-butylperoxyisopropyl)benzene, 1,4-bis(t-butylperoxyisopropyl)benzene, 1,1-di-t-butylperoxy-3,3-trimethyl cyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3,1,1-di-t-butylperoxy-3,5,5-trimethyl cyclohexane, p-chlorobenzoyl peroxide, t-butylperoxyisopropyl carbonate, t-butylperoxy benzoate, etc. may be mentioned. These may be used as single types alone or as a plurality of types together.

The polyamine-based cross-linking agent is not particularly limited so long as a compound having two or more amino groups or a compound which becomes one having two or more amino groups at the time of cross-linking, but a compound of an aliphatic hydrocarbon or aromatic hydrocarbon with a plurality of hydrogen atoms substituted by amino groups or hydrazide structures (structures expressed by —$CONHNH_2$, where CO indicates a carbonyl group) and a compound which becomes the form of such a compound at the time of cross-linking is preferable. As specific examples, an aliphatic polyvalent amine such as hexamethylene diamine, hexamethylene diamine carbamate, tetramethylenepentamine, hexamethylene diamine cinnamaldehyde adduct, and hexamethylene diamine dibenzoate salt; an aromatic polyvalent amine such as 2,2-bis{4-(4-aminophenoxy)phenyl}propane, 4,4'-methylenedianiline, m-phenylenediamine, p-phenylenediamine, and 4,4'-methylenebis (o-chloroaniline); a compound having two or more hydrazide structures such as dihydrazide isophthalate, dihydrazide adipate, dihydrazide sebacate, etc. may be mentioned. These may be used as single types alone or as a plurality of types together.

In the cross-linkable rubber composition of the present invention, the content of the cross-linking agent is not particularly limited, but it is preferably 0.1 to 10 parts by weight with respect to 100 parts by weight of the nitrile copolymer rubber, more preferably 0.2 to 5 parts by weight.

Furthermore, the cross-linkable rubber composition of the present invention may have blended into it, in addition to the nitrile group-containing copolymer rubber and cross-linking agent, other compounding agents which are usually used in the field of rubber processing. As such compounding agents, for example, a reinforcing agent, filler, photostabilizer, scorch preventer, plasticizer, processing aid, slip agent, tackifier, lubricant, flame retardant, acid acceptor, antifungal agent, antistatic agent, coloring agent, silane coupling agent, cross-linking aid, co-cross-linking agent, cross-linking accelerator, cross-linking retardant, foam agent, etc. may be mentioned. As the amounts of these compounding agents, amounts according to the purposes of inclusion may be suitably employed.

Furthermore, the cross-linkable rubber composition of the present invention may contain rubber other than the above-mentioned nitrile group-containing copolymer rubber of the present invention to the extent not impairing the advantageous effects of the present invention.

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluororubber, urethane rubber, chloroprene rubber, silicone rubber, natural rubber, polyisoprene rubber, etc. may be mentioned.

When mixing in rubber other than the nitrile group-containing copolymer rubber of the present invention, the amount in the cross-linkable rubber composition is preferably 30 parts by weight or less with respect to 100 parts by weight of the nitrile group-containing copolymer rubber, more preferably 20 parts by weight or less, still more preferably 10 parts by weight or less.

Further, the cross-linkable rubber composition of the present invention is prepared by mixing the above ingredients in a preferably nonaqueous system. The method of preparing the cross-linkable rubber composition of the present invention is not particularly limited, but the composition usually can be prepared by mixing the ingredients other than the cross-linking agent and ingredients which are unstable against heat such as the co-cross-linking agent etc. by a Bambury mixer, internal mixer, kneader, or other mixing machine for primary kneading, then transferring the mixture to open rolls etc. to add the cross-linking agent and co-cross-linking agent which are unstable against heat etc. for secondary kneading etc. Note that, the primary kneading is usually performed at 10 to 200° C., preferably 30 to 180° C. in temperature, for 1 minute to 1 hour, preferably 1 minute to 30 minutes, while the secondary kneading is usually performed at 10 to 90° C., preferably 20 to 60° C. in temperature, for 1 minute to 1 hour, preferably 1 minute to 30 minutes.

The thus obtained cross-linkable rubber composition of the present invention has a compound Mooney viscosity ($ML_{1+4}$, 100° C.) of preferably 10 to 200, more preferably 40 to 140, still more preferably 50 to 100 and is excellent in processability.

Cross-Linked Rubber

The cross-linked rubber of the present invention is one obtained by cross-linking the above-mentioned cross-linkable rubber composition of the present invention.

The cross-linked rubber of the present invention can be produced by using the cross-linkable rubber composition of the present invention, for example, using a molding machine which corresponds to the desired shape, for example, an extruder, injection molding machine, press, rolls, etc. for molding, heating to cause a cross-linking reaction and thereby fixing the shape as a cross-linked product. In this case, it is possible to mold the rubber, then cross-link it and possible to cross-link it simultaneously with molding. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on the shape, size, etc. of the cross-linked rubber, sometimes, even if the surface is cross-linked, the inside part is not sufficiently cross-linked, so it is possible to further heat the rubber for secondary cross-linking.

As the heating method, press heating, steam heating, oven heating, hot air heating, or other general methods which are used for cross-linking rubber may be suitably selected.

The thus obtained cross-linked rubber of the present invention is one obtained by cross-linking a cross-linkable rubber composition containing the above-mentioned nitrile group-containing copolymer rubber of the present invention and is excellent in normal physical properties. Further, the above-mentioned nitrile group-containing copolymer rubber of the present invention is high in fluidity and excellent in processability, so according to the present invention, such cross-linked rubber excellent in normal physical properties can be obtained well.

For this reason, the cross-linked rubber of the present invention, taking advantage of such a characteristic, can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, conveyor belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the electronics field.

EXAMPLES

Below, the present invention will be explained based on more detailed examples, but the present invention is not limited to these examples. Note that, below, unless particularly indicated, "parts" are based on weight. The tests and evaluations were conducted as follows.

Iodine Value

The iodine value of the nitrile group-containing highly saturated copolymer rubber was measured in accordance with JIS K 6235.

Weight Average Absolute Molecular Weight (Mw) and Weight Average Radius of Gyration The weight average absolute molecular weight (Mw) and weight average radius of gyration of the nitrile group-containing highly saturated copolymer rubber were measured by the GPC multi-angle light scattering method. Specifically, the nitrile group-containing highly saturated copolymer rubber was dissolved in chloroform, the obtained chloroform solution of the nitrile group-containing highly saturated copolymer rubber was run through a membrane filter (pore size 0.5 µm), then a gel permeation chromatography (GPC) system provided with a multi-angle light scattering (MALS) detector and differential refractometer was used to measure the weight average absolute molecular weight and weight average radius of gyration. Note that, the measurement was performed under the following conditions.

Device: product name "HLC-8220" (made by Toso)
Separation column: Product name "GMH-HR-H", product name "GMH-HR-H", and product name "G3000H-HR" (all made by Toso) connected in series.
Column temperature: 40° C.
Eluent: chloroform
Measuring device 1: Multi-angle light scattering detector, product name "Wyatt DAWN HELEOS-II" (made by Wyatt Technology)
Measuring device 2: differential refractometer "RI unit for HLC-8220 (made by Toso)"

Further, when using GPC multi-angle light scattering for measurement to determine the weight average absolute molecular weight and weight average radius of gyration, it is necessary to find the dn/dc value (increase in concentration of refractive index), but in the present measurement, as the chloroform solution of the nitrile group-containing highly saturated copolymer rubber, four types of solutions of different concentrations were prepared. A refractive index measuring device of the product name "Wyatt Optilab rEX" (made by Wyatt Technology) was used to measure the dn/dc value.

Processability (Fluidity)

The cross-linkable rubber composition was evaluated for fluidity using a rubber-use capillary rheometer (product name "Rubber Capillary Rheometer", made by Goettfert). Specifically, the device was set to a piston temperature of 100° C. and a chamber temperature of 100° C., the cross-linkable rubber composition was charged and was heated for 3 minutes, then the piston was used to extrude it by a 200 bar pressure and the amount of extrusion after 70 seconds (mm$^3$) was measured. The larger this amount, the better the processability (fluidity) that can be judged.

Normal Physical properties (Tensile Strength, 100% Tensile Stress, Elongation)

The cross-linkable rubber composition was placed on a vertical 15 cm, horizontal 15 cm, depth 0.2 cm mold and pressed by a press pressure of 10 MPa while being heated at 170° C. for 20 minutes to press-form it and obtain a sheet-shaped cross-linked rubber. The obtained sheet-shaped cross-linked rubber was punched by a No. 3 dumbbell shape die to prepare a test piece. Further, the obtained test piece was used in accordance with JIS K6251 to measure the cross-linked rubber for tensile strength at break, 100% tensile stress, and elongation.

Production Example 1 (Production of Nitrile Group-Containing Highly Saturated Copolymer Rubber (A1))

To a reactor, 200 parts of ion exchange water and 2.25 parts of fatty acid potassium soap (potassium salt of fatty acid) were added to prepare a soap aqueous solution. Further, to this soap aqueous solution, 19 parts of acrylonitrile and 0.35 part of t-dodecyl mercaptan (molecular weight adjuster) were charged in that order, the gas at the inside was replaced with nitrogen three times, then 68 parts of 1,3-butadiene were charged. Next, the inside of the reactor was held at 5° C., 0.1 part of cumen hydroperoxide (polymerization initiator) was charged, and the mixture was stirred while starting the first stage polymerization reaction. Further, at the point of time when the polymerization conversion rate with respect to the charged monomer reached 40%, 7 parts of acrylonitrile and 0.07 part of t-dodecyl mercaptan (molecular weight adjuster) were additionally added to perform the second stage polymerization reaction. After that, at the point of time when the polymerization conversion rate with respect to the charged monomer reached 60%, 6 parts of acrylonitrile and 0.05 part of t-dodecyl mercaptan (molecular weight adjuster) were additionally added to perform the third stage polymerization reaction. After that, at the point of time when the polymerization conversion rate with respect to the charged monomer reached 90%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (a1) (solid content concentration about 25 wt %).

Next, the above obtained latex of the nitrile group-containing copolymer rubber (a1) was added to an aqueous solution of an amount of aluminum sulfate of 3 wt % of the rubber content, the mixture was stirred to coagulate the latex, then the result was washed by water while separating them by filtration, then dried in vacuo at 60° C. over 12 hours to obtain the nitrile group-containing copolymer rubber (a1). Further, the obtained nitrile group-containing copolymer rubber (a1) was dissolved in acetone to a concentration 12%, this was placed in an autoclave, a palladium-silica catalyst was added in 500 weight ppm with respect to the nitrile group-containing copolymer rubber (a1), and a hydrogenation reaction was performed at a hydrogen pressure of 3 MPa and a temperature of 50° C. After the end of the hydrogenation reaction, the result was poured into a large amount of water to make it coagulate and the coagulated product was separated by filtration and dried to obtain the nitrile group-containing highly saturated copolymer rubber (A1). The composition of the obtained nitrile group-containing highly saturated copolymer rubber (A1) was acrylonitrile units: 32.3 wt % and 1,3-butadiene units (including hydrogenated part): 67.7 wt % and the iodine value was 5.8. Further, the above methods were followed to measure the weight average absolute molecular weight (Mw) and the weight average radius of gyration. The results are shown in Table 1.

Production Example 2 (Production of Nitrile Group-Containing Highly Saturated Copolymer Rubber (A2))

To a reactor, 200 parts of ion exchange water and 2.25 parts of fatty acid potassium soap (potassium salt of fatty acid) were added to prepare a soap aqueous solution. Further, to this soap aqueous solution, 55 parts of acrylonitrile and 0.55 part of t-dodecyl mercaptan (molecular weight adjuster) were charged in that order, the gas at the inside was replaced with nitrogen three times, then 34 parts of 1,3-butadiene were charged. Next, the inside of the reactor was held at 5° C., 0.1 part of cumen hydroperoxide (polymerization initiator) was charged, and the mixture was stirred while starting the first stage polymerization reaction. Further, at the point of time when the polymerization conversion rate with respect to the charged monomer reached 40%, 6 parts of 1,3-butadiene and 0.07 part of t-dodecyl mercaptan (molecular weight adjuster) were additionally added to perform the second stage polymerization reaction. After that, at the point of time when the polymerization conversion rate with respect to the charged monomer reached 60%, 5 parts of 1,3-butadiene and 0.05 part of t-dodecyl mercaptan (molecular weight adjuster) were additionally added to perform the third stage polymerization reaction. After that, at the point of time when the polymerization conversion rate with respect to the charged monomer reached 90%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (a2) (solid content concentration about 25 wt %).

Further, the same procedure was followed as in Production Example 1 to perform a hydrogenation reaction to obtain a nitrile group-containing highly saturated copolymer rubber (A2). The composition of the obtained nitrile group-containing highly saturated copolymer rubber (A2) was acrylonitrile units: 44.3 wt % and 1,3-butadiene units (including hydrogenated part): 55.7 wt % and the iodine value was 6.4. Further, the above methods were followed to measure the weight average absolute molecular weight (Mw) and the weight average radius of gyration. The results are shown in Table 1.

Production Example 3 (Production of Nitrile Group-Containing Highly Saturated Copolymer Rubber (A3))

To a reactor, 200 parts of ion exchange water and 2.25 parts of fatty acid potassium soap (potassium salt of fatty acid) were added to prepare a soap aqueous solution. Further, to this soap aqueous solution, 26 parts of acrylonitrile and 0.75 part of t-dodecyl mercaptan (molecular weight adjuster) were charged in that order, the gas at the inside was replaced with nitrogen three times, then 63 parts of 1,3-butadiene were charged. Next, the inside of the reactor was held at 5° C., 0.1 part of cumen hydroperoxide (polymerization initiator) was charged, and the mixture was stirred while starting the first stage polymerization reaction. Further, at the point of time when the polymerization conversion rate with respect to the charged monomer reached 35%, 6 parts of acrylonitrile and 0.07 part of t-dodecyl mercaptan (molecular weight adjuster) were additionally added to perform the second stage polymerization reaction. After that, at the point of time when the polymerization conversion rate with respect to the charged monomer reached 55%, 5 parts of acrylonitrile and 0.05 part of t-dodecyl mercaptan (molecular weight adjuster) were additionally added to perform the third stage polymerization reaction. After that, at the point of time when the polymerization conversion rate with respect to the charged monomer reached 90%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (a3) (solid content concentration about 25 wt %).

Further, the same procedure was followed as in Production Example 1 to perform a hydrogenation reaction to obtain a nitrile group-containing highly saturated copolymer rubber (A3). The composition of the obtained nitrile group-containing highly saturated copolymer rubber (A3) was acrylonitrile units: 36.1 wt % and 1,3-butadiene units (including hydrogenated part): 63.9 wt % and the iodine value was 6.9. Further, the above methods were followed to measure the weight average absolute molecular weight (Mw) and the weight average radius of gyration. The results are shown in Table 1.

Production Example 4 (Production of Nitrile Group-Containing Highly Saturated Copolymer Rubber (A4))

Except for, in Production Example 3, changing the amount of t-dodecyl mercaptan (molecular weight adjuster)

mixed in at the time of start of polymerization from 0.75 part to 0.45 part, the same procedure was followed as in Production Example 3 to obtain the nitrile group-containing highly saturated copolymer rubber (A4). The composition of the obtained nitrile group-containing highly saturated copolymer rubber (A4) was acrylonitrile units: 36.4 wt % and 1,3-butadiene units (including hydrogenated part): 63.6 wt % and the iodine value was 6.7. Further, the above methods were followed to measure the weight average absolute molecular weight (Mw) and the weight average radius of gyration. The results are shown in Table 1.

Production Example 5 (Production of Nitrile Group-Containing Highly Saturated Copolymer Rubber (A5))

Except for, in Production Example 3, changing the amount of t-dodecyl mercaptan (molecular weight adjuster) mixed in at the time of start of polymerization from 0.75 part to 0.20 part, the same procedure was followed as in Production Example 3 to obtain the nitrile group-containing highly saturated copolymer rubber (A5). The composition of the obtained nitrile group-containing highly saturated copolymer rubber (A5) was acrylonitrile units: 36.2 wt % and 1,3-butadiene units (including hydrogenated part): 63.8 wt % and the iodine value was 6.8. Further, the above methods were followed to measure the weight average absolute molecular weight (Mw) and the weight average radius of gyration. The results are shown in Table 1.

Production Example 6 (Production of Nitrile Group-Containing Highly Saturated Copolymer Rubber (A6))

To a reactor, 200 parts of ion exchange water and 2.25 parts of fatty acid potassium soap (potassium salt of fatty acid) were added to prepare a soap aqueous solution. Further, to this soap aqueous solution, 26 parts of acrylonitrile and 0.40 part of t-dodecyl mercaptan (molecular weight adjuster) were charged in that order, the gas at the inside was replaced with nitrogen three times, then 63 parts of 1,3-butadiene were charged. Next, the inside of the reactor was held at 5° C., 0.1 part of cumen hydroperoxide (polymerization initiator) was charged, and the mixture was stirred while starting the first stage polymerization reaction. Further, at the point of time when the polymerization conversion rate with respect to the charged monomer reached 30%, 6 parts of acrylonitrile and 0.07 part of t-dodecyl mercaptan (molecular weight adjuster) were additionally added to perform the second stage polymerization reaction. After that, at the point of time when the polymerization conversion rate with respect to the charged monomer reached 50%, 5 parts of acrylonitrile and 0.05 part of t-dodecyl mercaptan (molecular weight adjuster) were additionally added to perform the third stage polymerization reaction. After that, at the point of time when the polymerization conversion rate with respect to the charged monomer reached 80%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (a6) (solid content concentration about 25 wt %).

Further, the same procedure was followed as in Production Example 1 to perform a hydrogenation reaction to obtain a nitrile group-containing highly saturated copolymer rubber (A6). The composition of the obtained nitrile group-containing highly saturated copolymer rubber (A6) was acrylonitrile units: 36.3 wt % and 1,3-butadiene units (including hydrogenated part): 63.7 wt % and the iodine value was 6.8. Further, the above methods were followed to measure the weight average absolute molecular weight (Mw) and the weight average radius of gyration. The results are shown in Table 1.

Production Example 7 (Production of Nitrile Group-Containing Highly Saturated Copolymer Rubber (A7))

Except for, in Production Example 4, changing the amount of use of the palladium-silica catalyst used at the time of performing the hydrogenation reaction from 500 weight ppm to 200 weight ppm with respect to the rubber, the same procedure was followed as in Production Example 4 to obtain the nitrile group-containing highly saturated copolymer rubber (A7). The composition of the obtained nitrile group-containing highly saturated copolymer rubber (A7) was acrylonitrile units: 36.5 wt % and 1,3-butadiene units (including hydrogenated part): 63.5 wt % and the iodine value was 29.5. Further, the above methods were followed to measure the weight average absolute molecular weight (Mw) and the weight average radius of gyration. The results are shown in Table 1.

Production Example 8 (Production of Nitrile Group-Containing Highly Saturated Copolymer Rubber (A8))

Except for, in Production Example 4, changing the amount of use of the palladium-silica catalyst used at the time of performing the hydrogenation reaction from 500 weight ppm to 100 weight ppm with respect to the rubber, the same procedure was followed as in Production Example 4 to obtain the nitrile group-containing highly saturated copolymer rubber (A8). The composition of the obtained nitrile group-containing highly saturated copolymer rubber (A8) was acrylonitrile units: 36.7 wt % and 1,3-butadiene units (including hydrogenated part): 63.3 wt % and the iodine value was 58.2. Further, the above methods were followed to measure the weight average absolute molecular weight (Mw) and the weight average radius of gyration. The results are shown in Table 1.

Production Example 9 (Production of Nitrile Group-Containing Highly Saturated Copolymer Rubber (A9))

To a reactor, 200 parts of ion exchange water and 2.25 parts of fatty acid potassium soap (potassium salt of fatty acid) were added to prepare a soap aqueous solution. Further, to this soap aqueous solution, 15 parts of acrylonitrile and 0.30 part of t-dodecyl mercaptan (molecular weight adjuster) were charged in that order, the gas at the inside was replaced with nitrogen three times, then 85 parts of 1,3-butadiene were charged. Next, the inside of the reactor was held at 5° C., 0.1 part of cumen hydroperoxide (polymerization initiator) was charged, and the mixture was stirred while starting the first stage polymerization reaction. Further, at the point of time when the polymerization conversion rate with respect to the charged monomer reached 30%, 0.07 part of t-dodecyl mercaptan (molecular weight adjuster) was additionally added to perform the second stage polymerization reaction. After that, at the point of time when the polymerization conversion rate with respect to the charged monomer reached 50%, 0.05 part of t-dodecyl mercaptan (molecular weight adjuster) was additionally added to perform the third stage polymerization reaction. After that, at the point of time when the polymerization conversion rate with respect to the charged monomer reached 70%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (a9) (solid content concentration about 25 wt %).

Further, the same procedure was followed as in Production Example 1 to perform a hydrogenation reaction to obtain a nitrile group-containing highly saturated copolymer rubber (A9). The composition of the obtained nitrile group-containing highly saturated copolymer rubber (A9) was acrylonitrile units: 12.3 wt % and 1,3-butadiene units (including hydrogenated part): 87.7 wt % and the iodine value was 20. Further, the above methods were followed to measure the weight average absolute molecular weight (Mw) and the weight average radius of gyration. The results are shown in Table 1.

Production Example 10 (Production of Nitrile Group-Containing Highly Saturated Copolymer Rubber (B1))

To a reactor, 200 parts of ion exchange water and 2.25 parts of fatty acid potassium soap (potassium salt of fatty acid) were added to prepare a soap aqueous solution. Further, to this soap aqueous solution, 37 parts of acrylonitrile and 0.75 part of t-dodecyl mercaptan (molecular weight adjuster) were charged in that order, the gas at the inside was replaced with nitrogen three times, then 63 parts of 1,3-butadiene were charged. Next, the inside of the reactor was held at 5° C., 0.1 part of cumen hydroperoxide (polymerization initiator) was charged, and the mixture was stirred while starting the polymerization reaction. After that, at the point of time when the polymerization conversion rate with respect to the charged monomer reached 90%, 0.1 part of a concentration 10% hydroquinone (polymerization terminator) aqueous solution was added to stop the polymerization reaction. After stopping the polymerization reaction, a water temperature 60° C. rotary evaporator was used to remove residual monomer and to obtain a latex of nitrile group-containing copolymer rubber (b1) (solid content concentration about 25 wt %).

Further, the same procedure was followed as in Production Example 1 to perform a hydrogenation reaction to thereby obtain the nitrile group-containing highly saturated copolymer rubber (B1). The composition of the obtained nitrile group-containing highly saturated copolymer rubber (B1) was acrylonitrile units: 36.1 wt % and 1,3-butadiene units (including hydrogenated part): 63.9 wt % and the iodine value was 6.1. Further, the above methods were followed to measure the weight average absolute molecular weight (Mw) and the weight average radius of gyration. The results are shown in Table 1.

Production Example 11 (Production of Nitrile Group-Containing Highly Saturated Copolymer Rubber (B2))

Except for changing, in Production Example 10, the amount of the t-dodecyl mercaptan (molecular weight adjuster) mixed in at the time of start of polymerization from 0.75 part to 0.43 part, the same procedure was followed as in Production Example 10 to obtain a nitrile group-containing highly saturated copolymer rubber (B2). The composition of the obtained nitrile group-containing highly saturated copolymer rubber (B2) was acrylonitrile units: 36.4 wt % and 1,3-butadiene units (including hydrogenated part): 63.6 wt % and the iodine value was 6.4. Further, the above methods were followed to measure the weight average absolute molecular weight (Mw) and the weight average radius of gyration. The results are shown in Table 1.

Production Example 12 (Production of Nitrile Group-Containing Highly Saturated Copolymer Rubber (B3))

Except for changing, in Production Example 10, the amount of the t-dodecyl mercaptan (molecular weight adjuster) mixed in at the time of start of polymerization from 0.75 part to 0.20 part, the same procedure was followed as in Production Example 10 to obtain the nitrile group-containing highly saturated copolymer rubber (B3). The composition of the obtained nitrile group-containing highly saturated copolymer rubber (B3) was acrylonitrile units: 36.2 wt % and 1,3-butadiene units (including hydrogenated part): 63.8 wt % and the iodine value was 6.4. Further, the above methods were followed to measure the weight average absolute molecular weight (Mw) and the weight average radius of gyration. The results are shown in Table 1.

Example 1

Using a Bambury mixer, 100 parts of the nitrile group-containing highly saturated copolymer rubber (A1) obtained in Production Example 1, 50 parts of N774 carbon black (product name "Seast S", made by Tokai Carbon), 1.5 parts of 4,4'-di-(α,α-dimethylbenzyl)diphenylamine (product name "Nocrac CD", made by Ouchi Shinko Chemical Industrial, antiaging agent), and 5 parts of tri-2-ethylhexyl trimellitate (product name "ADK Cizer C-8", made by ADEKA, plasticizer) were kneaded. Next, the mixture was transferred to open rolls to blend in and knead 8 parts of 1,3-bis(t-butylperoxyisopropyl)benzene 40% product (product name "Vul Cup 40KE", made by GEO Specialty Chemicals Inc., organic peroxide cross-linking agent) to obtain a cross-linkable rubber composition.

Examples 2 to 9

Except for using, instead of 100 parts of the nitrile group-containing highly saturated copolymer rubber (A1) obtained in Production Example 1, 100 parts of the nitrile group-containing highly saturated copolymer rubbers (A2) to (A9) obtained in Production Examples 2 to 9, the same procedure was followed as in Example 1 to obtain cross-linkable rubber compositions.

Comparative Examples 1 to 3

Except for using, instead of 100 parts of the nitrile group-containing highly saturated copolymer rubber (A1) obtained in Production Example 1, 100 parts of the nitrile group-containing highly saturated copolymer rubbers (B1) to (B3) obtained in Production Examples 10 to 12, the same procedure was followed as in Example 1 to obtain cross-linkable rubber compositions.

TABLE 1

|  |  | Examples | | | | | | | | | Comparative Examples | | |
|---|---|---|---|---|---|---|---|---|---|---|---|---|---|
|  |  | 1 | 2 | 3 | 4 | 5 | 6 | 7 | 8 | 9 | 1 | 2 | 3 |
| Type of nitrile group-containing highly saturated copolymer rubber | | A1 | A2 | A3 | A4 | A5 | A6 | A7 | A8 | A9 | B1 | B2 | B3 |
| Monomer and molecular weight adjuster used at time of start of polymerization | | | | | | | | | | | | | |
| Acrylonitrile | (parts) | 19 | 55 | 26 | 26 | 26 | 26 | 26 | 26 | 15 | 37 | 37 | 37 |
| 1,3-butadiene | (parts) | 68 | 34 | 63 | 63 | 63 | 63 | 63 | 63 | 85 | 63 | 63 | 63 |
| t-dodecyl mercaptan | (parts) | 0.35 | 0.55 | 0.75 | 0.45 | 0.20 | 0.40 | 0.45 | 0.45 | 0.30 | 0.75 | 0.43 | 0.20 |
| Monomer and molecular weight adjuster added in mid-course (first time) | | | | | | | | | | | | | |
| Acrylonitrile | (parts) | 7 | — | 6 | 6 | 6 | 6 | 6 | 6 | — | — | — | — |
| 1,3-butadiene | (parts) | — | 6 | — | — | — | — | — | — | — | — | — | — |
| t-dodecyl mercaptan | (parts) | 0.07 | 0.07 | 0.07 | 0.07 | 0.07 | 0.07 | 0.07 | 0.07 | 0.07 | — | — | — |
| Polymerization conversion rate at time of mid-course addition (first time) | (%) | 40 | 40 | 35 | 35 | 35 | 30 | 35 | 35 | 30 | — | — | — |
| Monomer and molecular weight adjuster added in mid-course (second time) | | | | | | | | | | | | | |
| Acrylonitrile | (parts) | 6 | — | 5 | 5 | 5 | 5 | 5 | 5 | — | — | — | — |
| 1,3-butadiene | (parts) | — | 5 | — | — | — | — | — | — | — | — | — | — |
| t-dodecyl mercaptan | (parts) | 0.05 | 0.05 | 0.05 | 0.05 | 0.05 | 0.05 | 0.05 | 0.05 | 0.05 | — | — | — |
| Polymerization conversion rate at time of mid-course addition (second time) | (%) | 60 | 60 | 55 | 55 | 55 | 50 | 55 | 55 | 50 | — | — | — |
| Final polymerization conversion rate | (%) | 90 | 90 | 90 | 90 | 90 | 80 | 90 | 90 | 70 | 90 | 90 | 90 |
| Nitrile group-containing copolymer rubber | | | | | | | | | | | | | |
| Composition | Acrylonitrile units (%) | 32.3 | 44.3 | 36.1 | 36.4 | 36.2 | 36.3 | 36.5 | 36.7 | 12.3 | 36.1 | 36.4 | 36.2 |
|  | 1,3-butadiene units *1) (%) | 67.7 | 55.7 | 63.9 | 63.6 | 63.8 | 63.7 | 63.5 | 63.3 | 87.7 | 63.9 | 63.6 | 63.8 |
| Iodine value | | 5.8 | 6.4 | 6.9 | 6.7 | 6.8 | 6.8 | 29.5 | 58.2 | 20 | 6.1 | 6.4 | 6.4 |
| Weight average absolute molecular weight (Mw) | | 362000 | 337000 | 85000 | 348000 | 1E+06 | 339000 | 338000 | 353000 | 1326000 | 87000 | 389000 | 1E+06 |
| Weight average radius of gyration | (nm) | 47.1 | 60.7 | 28.0 | 52.1 | 70.4 | 52.7 | 53.1 | 51.1 | 79.6 | 8.0 | 101 | 107 |
| Evaluation of nitrile group-containing highly saturated copolymer rubber | | | | | | | | | | | | | |
| Amount of extrusion after 70 seconds (capillary extrudability) | (mm$^3$) | 3103 | 3712 | 5747 | 3711 | 3210 | 4115 | 3846 | 4051 | 3117 | 2510 | 1980 | 441 |
| Evaluation of cross-linked rubber | | | | | | | | | | | | | |
| Tensile strength | (MPa) | 26.1 | 28.4 | 24.1 | 28.1 | 34.1 | 27.1 | 28.9 | 29.1 | 32.4 | 10.4 | 19.7 | 18.9 |
| 100% tensile stress | (MPa) | 9.5 | 11.8 | 7.1 | 7.6 | 14.1 | 7.7 | 10.6 | 12.1 | 13.2 | 2.9 | 5.4 | 5.3 |
| Elongation | (%) | 250 | 210 | 340 | 280 | 170 | 280 | 230 | 200 | 180 | 110 | 60 | 80 |

*1) Including saturated parts.

As shown in Table 1, a nitrile group-containing copolymer rubber containing α,β-ethylenically unsaturated nitrile monomer units in a ratio of 10 to 60 wt % and having a weight average radius of gyration of 10 to 100 nm in range was excellent in processability (large in amount of extrusion after 70 seconds). Further, cross-linked rubber obtained using the nitrile group-containing copolymer rubber was excellent in normal physical properties (tensile strength, 100% tensile stress, and elongation) (Examples 1 to 9).

On the other hand, a nitrile group-containing copolymer rubber having a weight average radius of gyration of less than 10 nm and a nitrile group-containing copolymer rubber having a weight average radius of gyration of over 100 nm were poor in processability (small in amount of extrusion after 70 seconds). Further, cross-linked rubber obtained using the nitrile group-containing copolymer rubber was poor in normal physical properties (tensile strength, 100% tensile stress, and elongation) (Comparative Examples 1 to 3).

The invention claimed is:

1. A nitrile group-containing copolymer rubber containing α,β-ethylenically unsaturated nitrile monomer units in 10 to 60 wt % and having a weight average radius of gyration of 30 to 80 nm in range and a weight average absolute molecular weight is 100,000 to 362,000.

2. The nitrile group-containing copolymer rubber according to claim 1 wherein the nitrile group-containing copolymer rubber has an iodine value of 120 or less.

3. A cross-linkable rubber composition containing the nitrile group-containing copolymer rubber according to claim 1 and a cross-linking agent.

4. A cross-linked rubber obtained by cross-linking the cross-linkable rubber composition according to claim 3.

5. A method of production of the nitrile group-containing copolymer rubber according to claim 1 comprising
polymerizing a monomer containing an α,β-ethylenically unsaturated nitrile monomer in the presence of a molecular weight adjuster and
additionally adding the molecular weight adjuster at a stage when a polymerization conversion rate becomes 10 to 80% in the polymerizing.

6. The method of production of the nitrile group-containing copolymer rubber according to claim 5 wherein
a ratio of an amount of addition of the molecular weight adjuster at a time of start of polymerization and an amount of addition of the molecular weight adjuster in the additionally adding is a weight ratio of an "amount of addition of molecular weight adjuster at a time of start of polymerization:amount of addition of molecular weight adjuster in the additionally adding" of 0.5:1 to 1:0.1.

7. The method of production of the nitrile group-containing copolymer rubber according to claim 5 wherein
the step of additionally adding the molecular weight adjuster at a stage when a polymerization conversion rate becomes 10 to 80% in the polymerizing comprises:
additionally adding the molecular weight adjuster divided into a plurality of batches at a stage when the polymerization conversion rate becomes 10 to 80% in the polymerizing.

8. The method of production of the nitrile group-containing copolymer rubber according to claim 5 wherein
the step of additionally adding the molecular weight adjuster at a stage when a polymerization conversion rate becomes 10 to 80% in the polymerizing comprises:
additionally adding the molecular weight adjuster at
a stage when the polymerization conversion rate becomes 30 to 40% in the polymerizing and
at a stage when the polymerization conversion rate becomes 50 to 60% in the polymerizing.

* * * * *